(12) United States Patent
Loeffler et al.

(10) Patent No.: US 6,592,493 B2
(45) Date of Patent: Jul. 15, 2003

(54) SYSTEM FOR ADJUSTING A TRANSMISSION RATIO IN A TRANSMISSION BUILT INTO A MOTOR VEHICLE

(75) Inventors: Juergen Loeffler, Ludwigsburg (DE); Andrea Steiger-Pischke, Weissach (DE); Martin-Peter Bolz, Buehl (DE); Marko Poljansek, Reutlingen (DE); Wolfgang Hermsen, Kirchheim (DE); Holger Huelser, Stuttgart (DE); Rasmus Frei, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/750,060

(22) Filed: Dec. 29, 2000

(65) Prior Publication Data

US 2001/0006923 A1 Jul. 5, 2001

(30) Foreign Application Priority Data

Dec. 29, 1999 (DE) .......................... 199 63 564

(51) Int. Cl.⁷ .............................................. B60K 41/04
(52) U.S. Cl. .......................................... 477/115; 701/51
(58) Field of Search ................................ 477/115, 107, 477/78, 77; 701/51, 54, 55, 56, 58, 59

(56) References Cited

U.S. PATENT DOCUMENTS

| | | | |
|---|---|---|---|
| 5,157,609 A | | 10/1992 | Stehle et al. |
| 5,319,559 A | * | 6/1994 | Kusaka et al. ............... 180/338 |
| 5,351,776 A | | 10/1994 | Keller et al. |
| 5,711,712 A | * | 1/1998 | Graf .......................... 477/121 |
| 5,857,161 A | | 1/1999 | Zeilinger et al. |
| 5,941,793 A | * | 8/1999 | Ito et al. ..................... 477/120 |
| 5,948,034 A | * | 9/1999 | Tihanyi et al. ............... 477/120 |
| 5,954,617 A | * | 9/1999 | Horgan et al. ............... 123/349 |
| 5,995,896 A | * | 11/1999 | Depping et al. ............. 477/107 |
| 6,146,310 A | * | 11/2000 | Janecke ...................... 477/148 |
| 6,154,701 A | * | 11/2000 | Loffler et al. ................ 477/110 |
| 6,173,227 B1 | * | 1/2001 | Speicher et al. .............. 477/43 |
| 6,186,923 B1 | * | 2/2001 | Popp et al. .................. 477/115 |
| 6,216,077 B1 | * | 4/2001 | Loffler et al. ................. 701/51 |
| 6,314,357 B1 | * | 11/2001 | Kon et al. ................. 192/3.28 |
| 6,418,365 B1 | * | 7/2002 | Loffler et al. ................. 701/51 |

FOREIGN PATENT DOCUMENTS

| | | | |
|---|---|---|---|
| DE | 4136613 | 5/1993 | |
| DE | 197 57 328-A 1 | * 6/1999 | .......... F16H/59/68 |

OTHER PUBLICATIONS

"Die Adaptive Getriebesteuerung für die Automatikgetriebe der BMW Fahrzeuge mit Zwölfzylindermotor" by A. Welter et al, ATZ Automobiltechnische Zeitschrift 94 (1992) 9, pp. 428 to 436.

"Die Adaptive Getriebesteuerung für BMW–Automobile" by A. Welter et al, ATZ Automobiltechnische Zeitschrift 95 (1993) 9, pp. 420 to 434.

* cited by examiner

Primary Examiner—Rodney H. Bonck
Assistant Examiner—David D. Le
(74) Attorney, Agent, or Firm—Walter Ottesen

(57) ABSTRACT

The invention is directed to a system for adjusting a transmission ratio in a transmission built into a motor vehicle. The system includes at least two transmission ratio criteria with which first transmission ratios are determined based on at least two different determining modes. The system also includes a first arrangement with the aid of which a second transmission ratio is selected in accordance with a pregiven prioritization from the determined first transmission ratios. The transmission ratio is then adjusted in dependence upon the selected second transmission ratio. In an advantageous configuration of the invention, a second arrangement is provided with which the second transmission ratio is modified in accordance with a pregiven strategy. The transmission ratio is then adjusted in dependence upon the modified second transmission ratio.

8 Claims, 4 Drawing Sheets

| Transmission Ratio Criterion | ID: | UL | SS | HSV | RSV | DHSV | DRSV |
|---|---|---|---|---|---|---|---|
| Driving according to Driver Type | 1 | X | | | | | |
| Driving under Load | 2 | X | X | | | | |
| Driving in Winter | 3 | X | | | | X | X |
| Driving Downhill | 4 | X | X | X | | | |
| Almost off Accelerator Pedal | 5 | | | X | | | |
| In the Curve | 6 | X | | X | X | | |
| Selection Lever Position | 7 | X | | X | | | |
| Hot Mode | 8 | X | | | | | |

FIG. 5a

Tab_SS

| 2 | 4 | 99 |
|---|---|---|

FIG. 5b

Tab_ÜL

| 4 | 6 | 4 | 7 | 1 | |
|---|---|---|---|---|---|
| 2 | 2 | 1 | | | |
| 99 | 7 | 8 | 3 | 4 | 1 |

FIG. 5c

Tab_xSV

| HSV | 4 | 5 | 6 | 7 | | |
|---|---|---|---|---|---|---|
| 1 | 1 | 1 | 1 | 1 | | |
| 2 | 1 | 1 | 1 | 1 | | |
| 3 | 0 | 0 | 1 | 1 | | |
| 4 | 0 | 0 | 0 | 1 | | |
| 6 | 0 | 0 | 0 | 1 | | |
| 7 | 0 | 0 | 0 | 1 | | |
| 8 | 0 | 0 | 1 | 1 | | |

| RSV | 6 | | | | | |
|---|---|---|---|---|---|---|
| 1 | 1 | | | | | |
| 2 | 1 | | | | | |
| 3 | 1 | | | | | |
| 4 | 0 | | | | | |
| 6 | 0 | | | | | |
| 7 | 0 | | | | | |
| 8 | 0 | | | | | |

| DHSV | 3 | | | | | |
|---|---|---|---|---|---|---|
| 1 | 1 | | | | | |
| 2 | 1 | | | | | |
| 3 | 1 | | | | | |
| 4 | 1 | | | | | |
| 6 | 1 | | | | | |
| 7 | 1 | | | | | |
| 8 | 1 | | | | | |

| DRSV | 3 | | | | | |
|---|---|---|---|---|---|---|
| 1 | 1 | | | | | |
| 2 | 1 | | | | | |
| 3 | 1 | | | | | |
| 4 | 1 | | | | | |
| 6 | 1 | | | | | |
| 7 | 1 | | | | | |
| 8 | 1 | | | | | |

FIG. 5d

SYSTEM FOR ADJUSTING A TRANSMISSION RATIO IN A TRANSMISSION BUILT INTO A MOTOR VEHICLE

BACKGROUND OF THE INVENTION

Adaptive transmission controls are, for example, known from U.S. Pat. No. 5,157,609 and German patent publication 4,136,613 as well as from the articles from "Automobiltechnische Zeitschrift" 94 (1992) 9, starting at page 428 and from "Automobiltechnische Zeitschrift" 95 (1993) 9, starting at page 420. In automatic transmissions, the transmission changes are, in general, determined in dependence upon the vehicle longitudinal speed and the engine load (throttle flap angle). This takes place by means of a characteristic field. In adaptive transmission control systems, the characteristic field can be adapted to the behavior of the driver (driver type), the traffic situation and/or to the driving situation to which the vehicle is subjected. The transmission ratio changes are determined by means of the characteristic field. In setting the behavior of the driver, it is generally evaluated whether the driver adheres more to a driving-power orientated driving manner or more to a fuel optimized driving manner. In the evaluation of the traffic and driving situation, it can be distinguished, for example, whether the vehicle is in city traffic, ahead of or in a curve, on a hill or in overrun operation. Depending upon the evaluation of the above-mentioned points, the particular characteristic line which is suitable is selected from a number of different characteristic lines. Furthermore, a shifting of the base shifting characteristic field, as described in U.S. Pat. No. 5,857,161, can be provided.

In the known state of the art, for recognizing the type of driver, it is suggested to arrive at different types of estimation of the instantaneously present type of driver by means of different algorithms (for example, start-up evaluation, gradient evaluation). These estimates are then collected and processed to an instantaneous valid type of driver, for example, via maximum formation, weighted and/or sliding sum formation. In this processing, the above-mentioned various types of estimation are prioritized differently.

Reference can also be made to U.S. Pat. No. 6,216,077.

Furthermore, a hierarchially structured control of the elements of the drive train of a motor vehicle is known from U.S. Pat. No. 5,351,776. The drive train includes, for example, the engine, clutch/torque converter, transmission.

In electronic transmission controls (GS), it is therefore conventional to make the selection of the particular gear to be engaged in a stepped automatic transmission (AT) or in an automated shift transmission (ASG) on the basis of a plurality of criteria. The in part contradictory requirements of the criteria (for example, minimizing of the fuel consumption in contrast to high Dower reserve) can be considered via a prioritization which is dependent upon the driving state, driver command and the driving situation. Furthermore, situation-caused shifting restraints have to be considered. Here, a series of problems results. Accordingly, it is difficult to integrate new criteria because this brings with it a change of the already existing program code. The prioritization is partially directly hidden in the code. For this reason, it is difficult to adapt the prioritization to continuously changing requirements. In this way, the overview is missing which is needed for applying the prioritization.

SUMMARY OF THE INVENTION

The invention relates to an advantageous breakdown of the criteria in individual aspects and the sequence of the gear selection which results therefrom. This gear selection avoids the disadvantages and is a partial result of an object orientated analysis of the transmission control.

The system of the invention for adjusting a transmission ratio in a transmission built into a motor vehicle includes: at least two transmission criteria with which first transmission ratios are determined on the basis of at least two different determination modi; and, first means by means of which a second transmission ratio is selected in accordance with a pregivable prioritization from the determined first transmission ratios. The transmission ratio is then adjusted in dependence upon the selected second transmission ratio.

In an advantageous embodiment of the invention, second means are provided with which the second transmission ratio is modified in accordance with a pregivable strategy. The transmission ratio is then adjusted in dependence upon the modified second transmission ratio.

In a further embodiment of the invention, with the second means: a change of the adjusted transmission ratio is determined in dependence upon the instantaneous adjusted transmission ratio and the selected second transmission ratio; a check is made in accordance with a pregivable strategy as to whether the determined change is permitted; and, an adjustment of the transmission ratio in accordance with the determined change (HSV, REV, DHSV, DRSV) is only then undertaken when this change is permissible.

Here, it can be provided that the modification or the check of the permissibility of the change takes place in dependence upon the transmission ratio criterion which forms the selected second transmission ratio.

The determined changes can be upshifting operations, downshifting operations, double upshifting operations and/or double downshifting operations and/or pregivable multiple upshifting and/or multiple downshifting operations.

Furthermore, it can be provided that at least one transmission ratio criterion contains at least two shift characteristic lines which can be distinguished via pregivable codes.

In an especially advantageous embodiment of the invention, it is provided that the transmission ratio criteria and the first means for transmitting the first transmission ratios communicate via a criteria administrator. This affords a very simple applicability. Here, the first means communicate with the transmission ratio criteria by means of the criteria administrator via pregiven identification codes.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
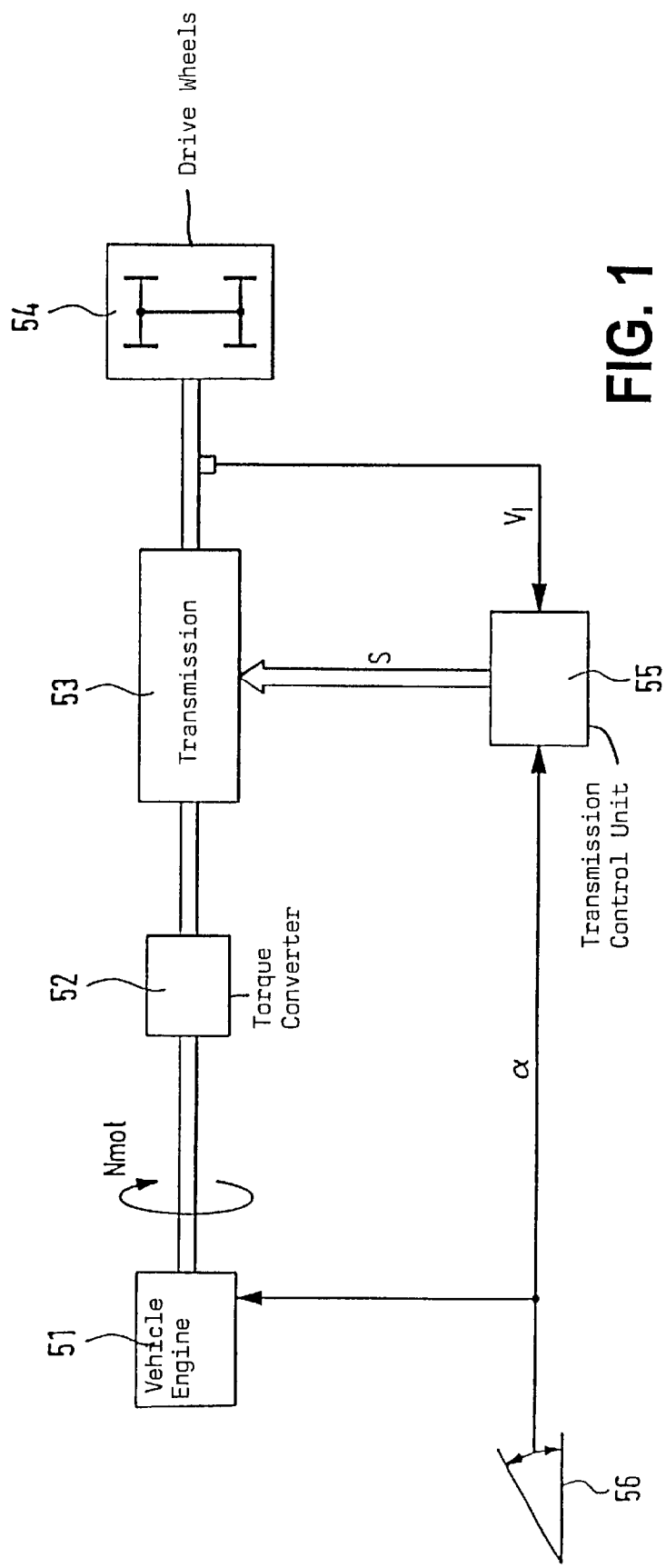
FIG. 1 schematically shows the drive train of a motor vehicle in the context of a block circuit diagram.

FIG. 1 shows the drive train of a motor vehicle. The vehicle motor 51 has a motor rpm Nmot and is connected via a clutch or a torque converter 52 and via the transmission 53 to the drive wheels 54 of the vehicle. The driver of the vehicle actuates the accelerator pedal 56 and adjusts an accelerator pedal angle α. The power and/or the torque of the vehicle motor 51 is controlled by the position a of the accelerator pedal 56. Furthermore, the position a of the accelerator pedal 56 is supplied to the transmission control unit 55. The transmission control unit 55 determines a transmission gear essentially in dependence upon the vehicle longitudinal speed $V_1$ and the position α. The transmission gear is set by means of a signal S on the transmission 53.

Figure 2:
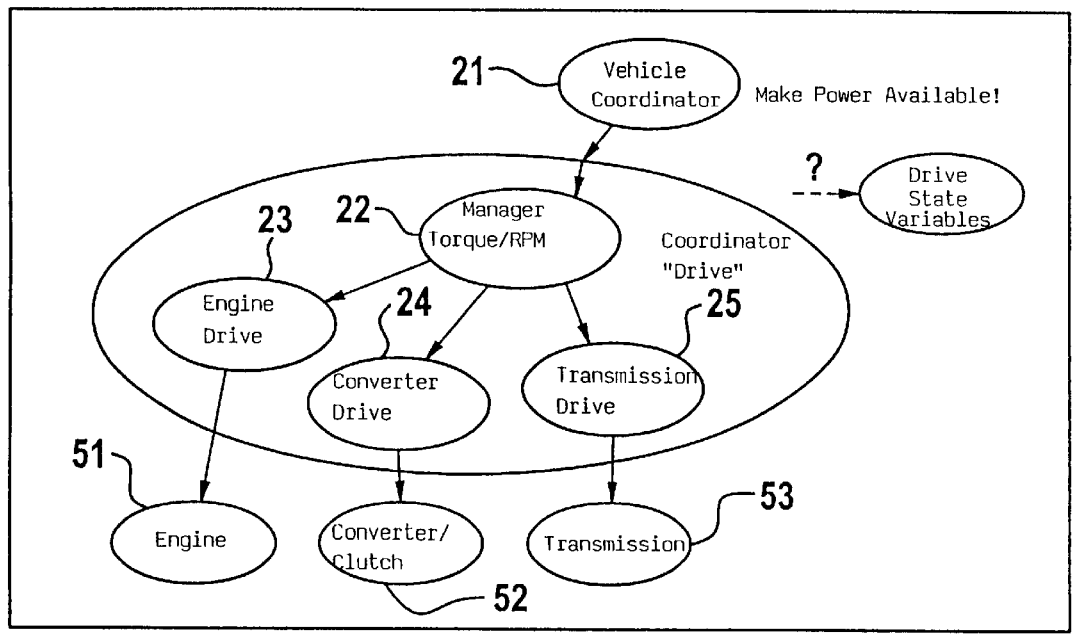
FIGS. 2 and 3 show structures for controlling the drive train.

FIG. 2 shows a hierarchially ordered structure for the control of the functions of the individual elements of the drive train. The program block "vehicle coordinator" 21 provides, as a rule, primarily dependent upon the driver command, a command/drive power or a command/drive torque to the vehicle wheels. The manager "torque/rpm" 22 converts this command into specific components which are converted by the motor 51, the torque converter 52 or the transmission 53 via the corresponding drivers 23, 24 and 25. For this purpose, reference can be made to U.S. Pat. No. 5,351,776. The invention relates to a portion of the transmission driver 25.

Figure 3:
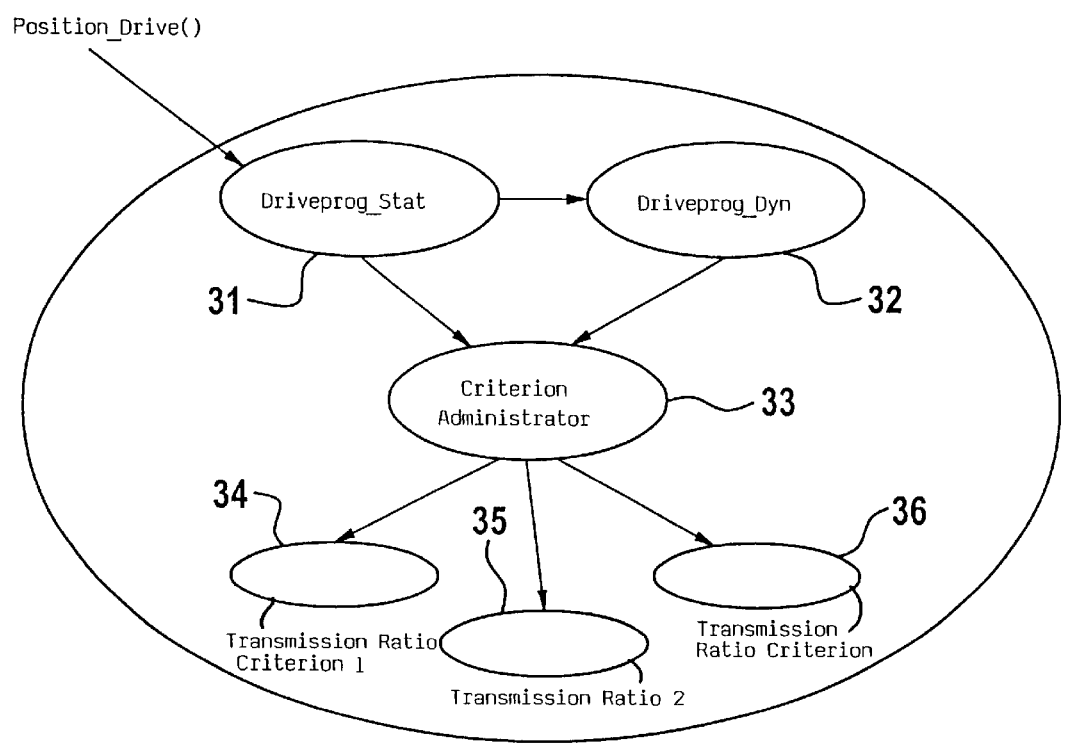

FIG. 3 shows the object "driving program" which is a part of the object "transmission-driver" 25 of FIG. 2 with its component object structure and communications structure. In the transmission driver 25, the selection of the suitable transmission ratio or of the suitable transmission gear takes place in the object "driving program" which is commanded from the outside to select a transmission gear with the command position_drive( ).

The driving program takes care of the selection of the transmission gear via its component objects "drive prog_ stat" 31, "drive prog_dyn" 32 and criteria administrator 33 which appear only once as well as via a desired number of transmission ratio criteria 34, 35 and 36.

Breakdown of the Criteria

Figure 4:
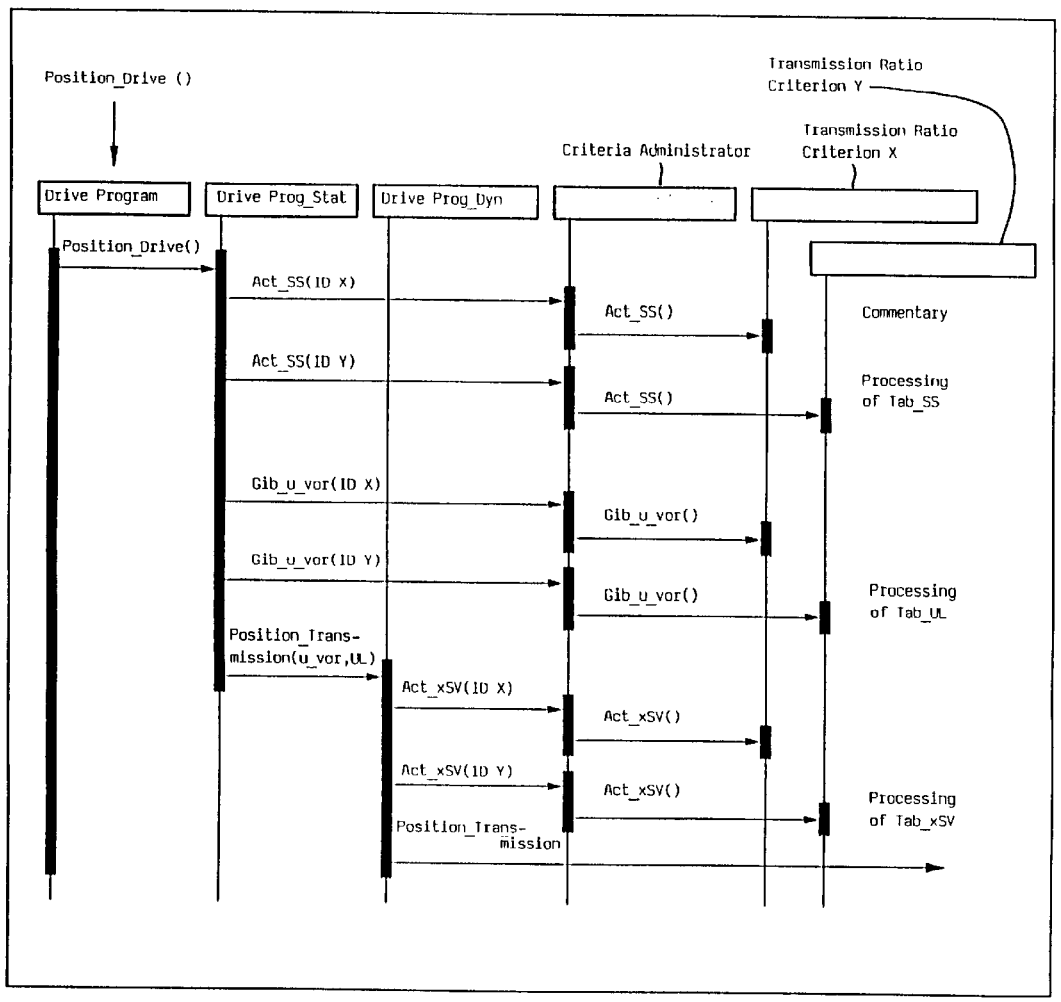
FIG. 4 shows the communication between the individual blocks shown in FIG. 3; and, FIGS. 5a to 5d show tables which describe the blocks shown in FIG. 3 in greater detail.

FIG. 4 shows the communication between the individual component objects shown in FIG. 3. This is a so-called interaction diagram of the command "position_drive( )" of the object "drive program". Reading FIG. 4 from top to bottom shows the sequence of the command call-ups between the participating objects or blocks.

The main task of the transmission ratio criteria (34 to 36) is to determine a gear selection from the driver command, the driving situation and the vehicle condition. For this purpose, different criteria are defined which each evaluate only specific aspects of the driving situation and of the vehicle state. With the command Gib_u_vor( ), these aspects are caused to make a gear selection corresponding to their aspect of the driving situation or the driver command or, when no corresponding situation or command is present, they are caused to explicitly make no gear selection. In this function, a transmission ratio criterion means a transmission ratio supplier (UL).

The transmission ratio providers are subject to a prioritization and the input of the priority is, in turn, dependent upon the driving situation and the vehicle state. For this purpose, a further task of the transmission ratio criteria 34 to 36 is defined which evaluate only specific aspects of the driving situation or the vehicle state. The transmission ratio criteria 34 to 36 mean in this function shifting situations SS. Each SS is computed if it is the right one or not and supplies the result back with the command call-up Act_SS( ). For each SS, a corresponding priority sequence of she transmission ratio provider UL exists.

A gear suggestion can be rejected when the difference to the actual gear in the actual situation is not permitted. This fact leads to the definition of a third task for the transmission ratio criteria which is called the shift inhibition SV. The method is described here and in the following for simple upshifting and downshifting as well as for double upshifting and double downshifting but is expandable in the same manner to any desired SV. The shift inhibition SV recognizes whether it is correct or not and supplies the result back with the command call-up Act_xSV( ) wherein x precisely identifies which type of SV is present (for example, HSV is upshift inhibition, DHSV is double upshift inhibition, RSV is downshift inhibition, DRSV is double downshift inhibition).

It has been shown to be advantageous to collect the tasks SS, UL and SV in an object "transmission ratio criterion" when these tasks are coupled to the same aspects of the driving situation or of the driver command. In this way, functional parts, which belong together, are unified in an object. A transmission ratio criterion can contain only one, two or all three of the tasks SS, UL and SV.

As an example, the transmission ratio criterion of "downhill" is mentioned because here, when driving a stretch which is downhill, all three tasks are present:

(a) a shift situation SS is present because the consideration of curves (UL of another transmission ratio criterion) assumes in this case an especially high priority which is not present in the other cases.

(b) The task of a UL is present when the engine drag torque is to be increased by downshifting to support the driver command of deceleration.

(c) An HSV is present when the driver attempts to compensate the acceleration caused by the downhill driving by pulling back on the accelerator pedal. In this case, an upshifting is triggered in the normal case which, however, reduces the engine drag torque so much that the downhill travel can no longer be compensated with the engine brake.

The method of the invention will now be described.

The method sequence for determining the actual gear suggestion is controlled by the objects "drive prog_stat" 31 and "drive prog_dyn" 32. In order to obtain a high level of applicability, the transmission ratio criteria 34 to 36 are not, however, addressed directly but communicate by means of identifiers ID. The conversion of the IDs to the actual objects takes place in the object criterion administrator 33. In lieu of the call-up "transmission criterion_XYZ:act_SS( )", the call-up "criteria administrator:act_SS(ID)" takes place.

A favorable result takes place when the IDs are realized as so-called function pointers. In this way, the criterion administrator 33 can be realized completely independently of the transmission criteria 34 to 36.

In the object "drive prog_stat" 31, a table tab_SS is stores (see FIG. 5b) which contains the IDs of the shift situations SS which are to be considered. The SS are sorted in tab_SS in accordance with their priorities and cannot be changed dynamically. The object "drive prog_stat" 31 works off the table tab_SS in sequence (from high to lower priority) in that it asks the criterion administrator 33 whether the shift situation SS with the inputted ID is active until the first active SS is found. For this reason, it is necessary to ensure that at least one SS is active at any time which, however, is given in practice.

With the shift situation SS found in this manner, the second table tab_UL (FIG. 5c) in the object "drive prog_ stat" 31 is processed. In the table tab_UL, the IDs of the transmission ratio providers UL are ordered for each shift situation SS to be considered and are entered in the order of their priority. The object "drive prog_stat" 31 first looks for the line of the actually active shift situation SS and thereafter processes the entered transmission ratio suppliers UL entered in this line in sequence (from high to lower priority) in that it asks the criterion administrator 33 as to the gear suggestion of the UL with the entered ID up to the time that the first gear suggestion is found. It is therefore necessary to ensure that, at each time, at least one UL of each SS makes a gear suggestion which, however, is given in practice.

The actual gear suggestion as well as the ID of the transmission ratio supplier UL, which had made the gear suggestion, are transmitted to the object "drive prog_dyn" 32. An expansion of the method insofar that the ID of the actual SS is also transmitted and is evaluated by "drive prog_dyn" is possible in the same manner but is more complex because the additional degree of freedom at the present time is not necessary.

In "drive prog_dyn" 32, a decision is made as to whether a shift inhibition SV inhibits the gear suggestion or not. For this purpose, the four tables, which are shown in FIG. 5d, are present for the shift inhibition SV:

tab_HSV,
tab_DHSV,
tab_RSV and
tab_DRSV.

In the first line of the tab_xSV, the IDs of all shift inhibitions SV are entered which offer an SV corresponding to the particular table. In the first column, the IDs of all transmission ratio suppliers UL are entered. In this way, the binary information is stored for each transmission ratio supplier UL as to whether a shift inhibition SV may inhibit a transmission ratio suggestion of this transmission ratio supplier UL or not.

The object "drive prog_dyn" 32 determines first whether the gear suggestion means an upshift, a double upshift, a downshifting or a double downshifting. If the gear suggestion means no shifting, then it can be prevented by no shift inhibition and is transmitted to the transmission.

Thereafter, in the corresponding table, all shift inhibitions SV are inquired of in sequence for which "permitted" is entered in the line with the ID of the UL supplying the transmission ratio suggestion in that the criteria administrator 33 is inquired of by means of the ID as to the corresponding shift inhibition SV for such a time until either one of the "permitted" SV requests a shift inhibition SV whereby the transmission ratio suggestion is rejected or until all entered SV are inquired of (no SV active) whereby the transmission ratio suggestion is transmitted unchanged to the transmission. For double shiftings, two additional characteristics apply:

1. If a simple upshifting (downshifting) is inhibited, then a double upshifting (double downshifting) is also inhibited.
2. If a double upshifting (double downshifting) is inhibited but a simple upshifting (downshifting) is permitted, then the transmission ratio suggestion of the double upshifting (double downshifting) is converted into a simple upshifting (downshifting) and transmitted to the transmission.

The first point leads to the situation that, for a suggested double shifting, not only the table for the double shifting inhibition but also the table for the simple shifting need be checked which advantageously takes place in the sequence that first the simple shift inhibition is checked which, if it applies, makes the check of the double shifting unnecessary.

In the same manner, the rules and the method for the double shifting can be expanded as desired to multiple shiftings (for example, triple shifting) or to a specific individual shifting (for example, precisely the shifting from gear 2 to gear 4 when double upshiftings are otherwise permitted).

The methods for finding the gear suggestions of the transmission suppliers UL are not a part of this invention. In practice, many transmission ratio suppliers UL act on a shift characteristic line (standard method in the transmission control). For this reason, it has been shown to be advantageous to introduce an object "shift characteristic line". In this object, all used shift characteristic lines (which can be distinguished via a clear ID) as well as the algorithm for computing the shift suggestion from the characteristic line are stored. The object is, with the command Gib_u_SK(ID, transmission output rpm, throttle flap position), caused to supply back a shift suggestion. The transmission output rpm and the throttle flap position and/or accelerator pedal position are explicitly transmitted in the command call-up. For this reason, the transmission ratio suppliers UL, which require the object "shift characteristic line" for determining their shift suggestion, can carry out corresponding shifts as they are disclosed, for example, in U.S. Pat. No. 5,857,161 as mentioned initially herein.

An example of an application will now be described.

The tables in FIGS. 5a to 5d show a specific example of the invention.

In FIG. 5a, a table of the transmission ratio criteria is shown with information of the IDs as well as the functions "shift situation SS" contained therein, "transmission ratio supplier UL" and "shift inhibition SV". The table, which is shown in FIG. 5a, serves only for facilitating understanding and is itself not a component of the procedure of the invention.

The table tab_SS, which is shown in FIG. 5b, is stored in the object "drive prog_stat" 31. The IDs of all relevant shift situations SS are here listed in the sequence of their priority (the sequence determines the priority, falling priority from left to right).

In the shift situation SS with the ID=99, there is a standard shift situation which always applies when none of the two special SS ID=2 or ID=4 is active.

The table tab_UL is likewise stored in the object "drive prog_stat" 31. In the table tab_UL, the IDs of the relevant transmission ratio suppliers UL are entered in the sequence of their priority for each shift situation SS (first column). The sequence determines the priority, falling priority from left to right.

The table tab_xSV is stored in the object "drive prog_dyn" 32 and the IDs of all transmission ratio suppliers UL are listed in column 1. In the first line, all IDs of the shift inhibitions SV corresponding to the table are entered. In this way, an entry can be made for each shift inhibition SV as to whether or not it is permitted to prevent the shift suggestion of specific transmission ratio suppliers UL (1=permitted, 0=not permitted).

In view of the various criteria, the following advantages of is the invention are presented:

Applicability
  The priority of different aspects for the gear selection permits application as desired without change of code. An excellent overview is provided for the application because, by means of the tables, no parameters or individual priorities apply but the basis of the method sequence itself is applied.
Expandability
  The number of the transmission ratio criteria 34 to 36 is practically unlimited. An expansion of the gear selection by new transmission ratio criteria is simple because the method presents fixedly defined interfaces. For the new criterion, only an ID need be given and made known in the criteria administrator 33.

Functionality

With the introduction of the shifting situations SS, a situation dependent dynamic prioritization arises which was up to now not applicable or only applicable with difficulty. The method of the transmission ratio criteria for gear selection does not go into the method for prioritization. For this reason, a high flexibility compared to different requirements of various vehicle manufacturers is provided.

Reusability

For different demands, only the transmission ratio criteria need be changed and the method and the structure of the gear selection remain constant. A high degree of reusability is achieved because of fixedly defined interfaces and great flexibility. Transverse connections between gear ratio criteria for mutual prioritization are avoided by the dynamic prioritization by means of shift situations SS. The prioritization greatly hinders a reusability.

It is understood that the foregoing description is that of the preferred embodiments of the invention and that various changes and modifications may be made thereto without departing from the spirit and scope of the invention as defined in the appended claims.

What is claimed is:

1. A system for adjusting a transmission ratio in a transmission built into a motor vehicle, the system comprising:

at least two transmission ratio criteria (UL) by means of which a first plurality of transmission ratios (u_vor) are determined on the basis of at least two different determination modes;

first means (driveprog_stat) by means of which a second transmission ratio (u_vor, UL) is selected in accordance with a pregivable prioritization (tab_UL) from the determined first plurality of transmission ratios (u_vor) in that said transmission ratio criteria (UL) are processed in accordance with a priority sequence starting with the transmission ratio criterion of the highest priority until a transmission ratio criterion is found which has determined a transmission ratio, said priority sequence being fixed by said pregivable prioritization (tab_UL); and, the transmission ratio is then adjusted in dependence upon the so selected second transmission ratio.

2. The system of claim 1, wherein at least one transmission ratio criterion (UL) contains at least two shift characteristic lines which can be distinguished via pregivable codes.

3. The system of claim 1, wherein the transmission ratio criterion (UL) and the first means (driveprog_stat) for transmitting the first transmission ratios (u_vor) communicate via a criterion administration.

4. The system of claim 3, wherein the first means (driveprog_stat) communicates by means of the criterion administrator via pregivable identification codes (ID).

5. The system of claim 1, further comprising:

second means (driveprog_dyn) by means of which the second transmission ratio (transmission(u_vor, UL)) is modified in accordance with a pregivable strategy (TAB_xSV); and, the transmission ratio is adjusted in dependence upon the modified second transmission ratio.

6. The system of claim 5, wherein:

a change (HSV, RSV, DHSV, DRSV) of the adjusted transmission ratio is determined with said second means (driveprog_dyn) in dependence upon the instantaneous adjusted transmission ratio and the selected second transmission ratio (transmission(u_vor, UL));

a check is made in accordance with a pregiven strategy (Tab_xSV) as to whether said change (HSV, RSV, DHSV, DRSV) of said adjusted transmission ratio is permissible; and, an adjustment of the transmission ratio in accordance with the said change (HSV, RSV, DHSV, DRSV) is only then undertaken when this change is permissible.

7. The system of claim 6, wherein the modification or the check of the reliability of the change takes place in dependence upon the transmission ratio criterion (UL) which forms the selected second transmission ratio (transmission (u_vor, UL)).

8. The system of claim 6, wherein said change (HSV, RSV, DHSV, DRSV) is at least one of the following: an upshift operation, downshift operation, double upshift operation, double downshift operation, pregivable multiple upshift operations and pregivable multiple downshift operations.

* * * * *